May 15, 1923.

J. BESCH 1,455,563

BRAKE LEVER HANDLE GUARD

Filed Aug. 11, 1921

INVENTOR.
Joseph Besch
BY
John C. Matson
ATTORNEY

Patented May 15, 1923.

1,455,563

UNITED STATES PATENT OFFICE.

JOSEPH BESCH, OF ALBANY, NEW YORK.

BRAKE-LEVER HANDLE GUARD.

Application filed August 11, 1921. Serial No. 491,566.

*To all whom it may concern:*

Be it known that I, JOSEPH BESCH, a citizen of the United States of America, residing at Albany, in the county of Albany and State of New York, have invented certain new and useful Improvements in Brake-Lever Handle Guards, of which the following is a specification.

My invention relates to automobile accessories and the object of my invention is to provide an adjustable safety guard which is adapted to be attached to the brake lever of an automobile so as to insure that the driver will always have easy and free access to the handle of the brake lever.

When there is a passenger occupying the seat alongside of the driver it almost invariably happens that the knee or thigh of the passenger comes into contact with the handle of the brake lever and makes it impossible for the driver to quickly grasp the handle of said lever, and although the delay caused may be only a fraction of a second it greatly increases the danger of accident.

To eliminate this accidental contact between the handle of the brake lever and the knee or thigh of the passenger, I have invented an adjustable guard which is capable of being easily attached to the brake lever of an automobile so as to prevent such contact and insure that the handle thereof is constantly exposed so that it may be quickly grasped by the driver.

My brake lever handle guard is illustrated in the accompanying drawings, in which.

The same reference characters refer to the same parts throughout the several views.

Figure 1:
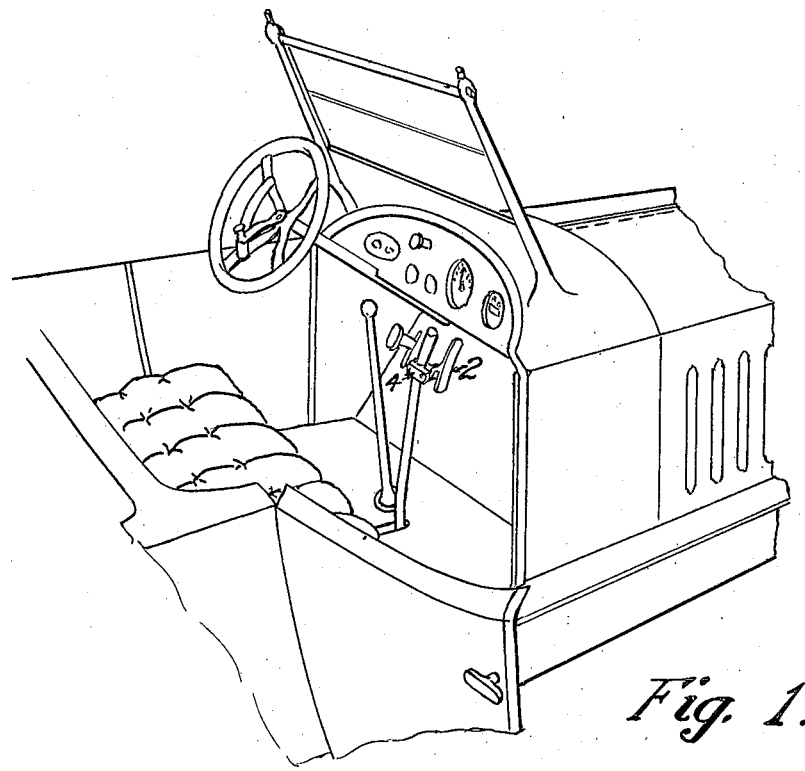
Fig. 1 is a perspective view illustrating my device applied to the brake lever of an automobile.
Figure 2:
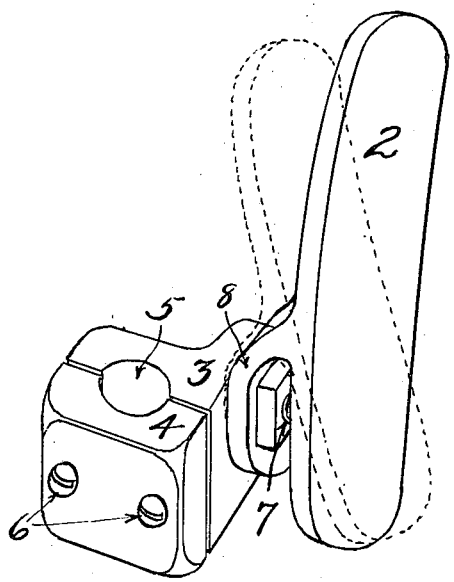
Fig. 2 is a perspective view of the device.

Referring to the drawings, 3 and 4 are parts of one form of clamping device having an opening 5 therethrough adapted to fit about and clamp onto the brake lever of an automobile. The parts of the clamping device may be fastened together and clamped onto the lever by means of the screws 6 or in any other suitable manner.

To one piece of the clamping device is adjustably attached, as by the bolt 7 or other suitable means, the guard member 2, so shaped and dimensioned that it will lie in a plane substantially parallel to the handle of the lever but spaced therefrom.

In cars which have only foot controlled brakes the safety device herein described would be applied to the shift lever which in this type of car would be the one which would be liable to be blocked by the thigh or knee of the passenger.

With my device attached to the brake lever of an automobile (or the gear shift lever) substantially as illustrated, the guard member 2 will be interposed between the handle of the lever and the thigh or knee of the passenger occupying the seat alongside the driver and the handle will always be exposed so as to be easily accessible.

I claim:

The combination with the brake lever of an automobile of a guard member attached thereto so as to interpose between the handle of said lever and the limbs of a passenger occupying the seat alongside of the driver.

In testimony whereof I have affixed my signature.

JOSEPH BESCH.